United States Patent
Adriaansen et al.

(10) Patent No.: US 8,042,360 B2
(45) Date of Patent: Oct. 25, 2011

(54) GLASS HANDLING AND PROCESSING SYSTEM

(75) Inventors: Scott Lee Adriaansen, Elmira, NY (US); Jianhua Li, Corning, NY (US); Creighton J Miller, Burdett, NY (US); Paul Maynard Schermerhorn, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/959,858

(22) Filed: Dec. 3, 2010

(65) Prior Publication Data

US 2011/0075140 A1    Mar. 31, 2011

Related U.S. Application Data

(62) Division of application No. 11/599,946, filed on Nov. 15, 2006, now Pat. No. 7,866,185.

(51) Int. Cl.
*C03B 9/41* (2006.01)
(52) U.S. Cl. ......... 65/158; 65/29.1; 65/29.2; 198/339.1; 198/340; 198/346.2; 356/239.1; 356/239.2
(58) Field of Classification Search .............. 65/29.1, 65/29.2, 158; 198/339.1, 340, 346.2; 356/239.1, 356/239.2
See application file for complete search history.

(56) References Cited

U.S. PATENT DOCUMENTS

| 4,058,200 | A | 11/1977 | Frank ............................ 198/382 |
| 4,585,343 | A | 4/1986 | Schave et al. ................. 356/237 |
| 4,666,493 | A | 5/1987 | Frank et al. ....................... 65/29 |
| 5,104,523 | A | 4/1992 | Masaharu et al. ............ 209/585 |
| 6,681,916 | B2 | 1/2004 | Hiroki ........................ 198/347.1 |
| 7,260,959 | B2 | 8/2007 | Chang et al. ................... 65/25.3 |
| 2003/0076487 | A1 | 4/2003 | Cannon et al. ................. 356/33 |
| 2005/0103055 | A1 | 5/2005 | Gfeller et al. .................. 65/112 |
| 2005/0105992 | A1 | 5/2005 | An et al. ....................... 414/280 |
| 2006/0150678 | A1 | 7/2006 | Chen et al. .................... 65/29.14 |

OTHER PUBLICATIONS http://www.coreflow.com "CoreFlow supplies air-float systems for flat panel display (FPD) production".

*Primary Examiner* — Matthew Daniels
*Assistant Examiner* — Russell Kemmerle, III
(74) *Attorney, Agent, or Firm* — Thomas R. Beall (57) ABSTRACT

Systems, methods and apparatus relate to handling and processing glass, such as glass for use in liquid crystal displays, involving a measurement device, such as a distortion gauge, residing in an environmentally controlled measurement room, and a cassette loading device for storage and conveyance of glass between the measurement device and other components of a glass handling and processing system residing with the cassette loading device in a preparation room. A mail-slot opening may be present in a wall separating the measurement room from the preparation room. A gauge conveyor may convey glass between the cassette loading device and the measurement device. A distortion gauge may measure a reference value of the product glass with respect to reference marks on a glass reference plate of the distortion gauge. Other examples of a measurement device include a warp gauge, a stress gauge, a thickness gauge, and a compaction gauge.

7 Claims, 13 Drawing Sheets

GLASS HANDLING AND PROCESSING SYSTEM

This is a Divisional of U.S. patent application Ser. No. 11/599,946 filed on Nov. 15, 2006, now U.S. Pat. No. 7,866,185 the content of which is relied upon and incorporated herein by reference in its entirety.

BACKGROUND

1. Field of Invention

The present invention relates to systems, methods and apparatus relating to handling and processing of glass, such as for use in a liquid crystal display (LCD), and in particular to a LCD glass handling and processing system.

2. Description of Related Art

Producing flat product glass for LCD displays involves many challenges. A key requirement in this process is the ability to measure characteristics of the product glass, such as product distortion due to internal stresses in large product glass plates. Some large product glass plates range in size up to 3.2 meters square. Optical methods and gauging techniques have developed over the past several years to enable distortion measurement via optical means. Distortion measurement may be done by comparing scribed reference marks on the product glass with scribed reference marks on a precision scribed glass reference plate, before and after a glass shearing process. A measured difference between such scribe marks is relatable to a level of stress in the product glass. Manufacturers also might desire to measure glass warp, glass compaction, glass thickness, etc., for which relevant measurement devices are used, such as warp gauges, compaction gauges, thickness gauges, etc.

One such measurement apparatus is a distortion gauge, a goal of which is to measure increasingly larger display glass sizes. The prior maximum size of the display glass was 3.2 meters for the distortion gauge and related equipment. Among its various parts, a distortion gauge includes a granite base, a precision scribed glass reference plate on top of the granite base, and optical measurement equipment. In the past, a glass reference comprised of a single sheet of glass was used because of small glass product sizes that were being measured. To accommodate the desire for larger product glass sizes, larger single sheet glass reference plates are desired. However, reference glass and product glass of such larger sizes are difficult to process and handle due to their size, fragility, and sensitivity. Even minor damage to a portion of the reference plate glass may require replacement of the entire single sheet. Nevertheless, it would be desirable to have a suitable glass handling and processing systems and methods able to handle larger glass product sizes.

It would therefore be desirable to further improve the handling and processing technology applicable to the manufacture of larger product glass sheets, while minimizing the challenges and risks associated with such large product glass and glass reference plate sizes.

SUMMARY OF THE INVENTION

In accordance with one or more embodiments of the present invention, systems, methods and apparatus relate to handling and processing glass, such as glass for use in liquid crystal displays, involving a glass characteristic measurement device, such as a distortion gauge, residing in an environmentally controlled measurement room, and a cassette loading device for storage and conveyance of glass between the measurement device and other components of a glass handling and processing system.

According to one or more embodiments of the present invention, a method of handling and processing glass may include conveying through a mail-slot opening with a gauge conveyor, a mother sheet of product glass between a cassette loading device and a measurement device, such as a distortion gauge. The method further may include measuring a reference value of the mother sheet with respect to reference marks on a glass reference plate of the distortion gauge; wherein the measurement device, e.g., distortion gauge, and gauge conveyor reside in a measurement room, the measurement room is environmentally controlled, the cassette loading device resides in a preparation room, and the mail-slot opening is present in a wall separating the measurement room from the cassette loading device.

According to one or more embodiments of the present invention, the method further may include conveying, with an infeed conveyor, the product glass between the cassette loading device and a score-and-break table; scoring the mother sheet; and breaking the mother sheet into child samples. Additional actions also may include conveying, through the mail-slot opening and with the gauge conveyor, a child sample between the cassette loading device and the distortion gauge; and measuring a distortion value of the child sample with respect to the reference marks on the glass reference plate; wherein a comparison of the distortion value and the reference value enables a computation of a distortion level present in a child sample.

According to one or more embodiments of the present invention, a system for handling and processing product glass may include a glass characteristic measurement device, such as a distortion gauge, and a gauge conveyor. An exemplary distortion gauge may have a glass reference plate with reference marks, a flat base, and measuring gauge equipment operable to measure a reference value of product glass with respect to the reference marks on the glass reference plate. The gauge conveyor may have a gauge conveyor belt mechanism and a gauge conveyor air pressure mechanism. The glass characteristic measurement device and gauge conveyor may reside in a measurement room that is environmentally controlled. The gauge conveyor may be operable to convey product glass between a preparation room and the glass characteristic measurement device through a mail-slot opening present in a wall separating the measurement room from the preparation room.

According to one or more embodiments of the present invention, the system further may include a cassette loading device having a belt mechanism and a shelf mechanism. The cassette loading device may reside in the preparation room, be operable to store the product glass, and be operable to convey the product glass between the gauge conveyor and an infeed conveyor residing in the preparation room. The cassette loading device also may be operable to store the glass LCD master and to convey the glass LCD master between the cassette loading device and the measurement device, e.g., distortion gauge, through the mail-slot opening and with the gauge conveyor.

According to one or more embodiments of the present invention, the system further may include the infeed conveyor having an infeed conveyor belt mechanism and an infeed conveyor air pressure mechanism. The infeed conveyor may be operable to convey the product glass between the cassette loading device and a score-and-break table residing in the preparation room. The system additionally may include the score-and-break table ("SBT") having an SBT air pressure mechanism, an optional SBT belt mechanism, and a gantry with a gantry head. The score-and-break table may be operable to convey the product glass with the infeed conveyor, to score the product glass; to trim the product glass into a mother sheet, and to break the product glass into child samples. Moreover, the system may include one or more glass sensors for positioning and tracking glass, the sensors being located, for instance, on the gauge conveyor, the cassette loading device, the infeed conveyor, and/or the gantry head.

According to one or more embodiments of the present invention, the gauge conveyor may be operable to convey a child sample between the cassette loading device and the measurement device, e.g., distortion gauge, through the mail-slot opening. The distortion gauge may be operable to measure a distortion value of the child sample with respect to the reference marks on the glass reference plate, such that a comparison of the distortion value and the reference value enables a computation of a distortion level present in a child sample.

According to one or more embodiments of the present invention, an apparatus for handling and processing product glass may comprise a cassette loading device having a belt mechanism, a shelf mechanism, and a glass sensor. The belt mechanism may be operable to convey glass between adjacent components of a glass handling and processing system, the shelf mechanism may operable to store glass received from the adjacent components of the glass handling and processing system, and glass sensors may be operable to monitor the motion of the glass. The cassette loading device further may include an adapter operable to connect the cassette loading device to the mail-slot opening of the measurement room of the glass handling and processing system.

According to one or more embodiments of the present invention, the shelf mechanism may include a plurality of shelves having drive belts (any number of shelves may be employed). In general, the shelves are operable to store a glass master plate, store one or more product glass child samples, and/or provide a transfer mechanism. For example, a top shelf may be operable to store a glass master plate, a plurality of middle shelves may be operable to store product glass child samples, and one or more remaining shelves may be operable as a transfer mechanism between adjacent components of the glass handling and processing system.

According to one or more embodiments of the present invention, a glass reference plate of a distortion gauge may be made using a glass having thermal expansion properties similar to those of the product glass to be measured. One or more embodiments of the glass reference plate may be constructed of Schott Borofloat Borosilicate Glass, ground and polished on both sides for a finished thickness of 6.8 mm. The top side of the plate may be scribed for use as measurement witness marks. The bottom side of the plate may have an opaque and/or reflective coating, such as a thin layer of PVD aluminum protected by glass. The plate may be perforated with holes to allow air flow as necessary to float (via positive air pressure of forced air) or hold (via negative air pressure of suction) the product glass as required.

The advantages of this invention are best understood after reading the detailed technical description, and in relation to existing glass handling and processing systems. Nonetheless, the advantages may include the scalability of the process and system to large product glass and correspondingly large reference and master plates. The present invention enables handling and processing of a wide range of product glass, from small size samples to extremely large LCD sheets, in a horizontal and low stress condition. This scalability potentially extends the product life of the system in general, particularly the measurement device-related components, such as the glass master, reference plate and distortion gauge, as customer substrate size requirements increase or change. Furthermore, handling glass in such a horizontal and low stress condition has commercial implications for loading not only other metrology gauges but other processing equipment for cleaning, cutting and printing LCD panels.

Broadly speaking, the invention has advantages addressing several problems associated with controlling samples, automatic loading of both mother sheets and child samples, controlling environmental conditions and storage of glass samples for metrology. This invention provides numerous other advantages, of which, the following are representative.

For instance, the measurement room may remain isolated from the rest of the system insofar as glass is conveyed through a mail-slot located in the wall between the cassette and the gauge conveyor. This arrangement allows glass sheets to be delivered into the measurement room with little to no impact to the environmental conditions within the clean room. The isolation of the measurement room enables tight environmental control of conditions including cleanliness, temperature and relative humidity. For example, the measurement room may have a limited temperature range of 20 degrees C.+/−0.1 degree C. and a limited relative humidity range of +/−2% of set point.

In addition, the infeed conveyor may serve multiple purposes. The first is to provide floatation for moving and positioning glass when cutting glass into child samples on the score-and-break table. Because the break area is near the infeed conveyor, it is advantageous to provide a horizontal surface to float the glass during positioning over the breaker bar. Once the glass is moved into position, the air is turned off and the glass is broken. At this point, the belts on the infeed conveyor allow glass to be moved from the infeed conveyor to the cassette loading device.

Beyond simply transporting the glass, the cassette loading device provides a means of storing glass child samples in a horizontal (low stress) condition until either the score-and-break table or the measurement device, e.g., distortion gauge, is ready for a sample. In one or more embodiments, the top shelf of the cassette loading device provides a location to store the glass master used to perform reproducibility and repeatability measurements on the distortion gauge. The cassette loading device may be located just outside the measurement room. The cassette loading device, along with the infeed conveyor and gauge conveyor, allows transfer of glass between the score-and-break table and the glass characteristic measurement device.

Likewise, the gauge conveyor allows transfer of glass between the cassette loading device and the measurement device, e.g., distortion gauge. However, the gauge conveyor may be located inside the measurement room. Moving through the mail slot in the wall of the measurement room, glass may be delivered between the cassette loading device and the gauge conveyor.

Moreover, the glass handling and processing system is capable of transferring LCD glass sheets between the infeed conveyor, cassette loading device and gauge conveyor in a fully automatic or manual mode. For example, glass sensors, such as KEYENCE sensors, may be used on the infeed conveyor trailing edge and gauge conveyor leading and trailing edge to automatically detect and control the position of the glass samples. Glass is scored, trimmed and broken on a score-and-break table, and glass is delivered across infeed belt conveyor system onto a cassette loading device.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown, but rather only by the issued claims. The drawings may not be to rendered scale, and the aspects of the drawings may not be rendered to scale relative to each other.

DETAILED DESCRIPTION OF THE PRESENT INVENTION

Measurement of product glass in the course of display production is a moving target as display sizes change. Of increasing interest is the correlation between stress and distortion measurements from GEN 3 to GEN 9 (3200 mm square) LCD glass sheets. This glass size range and large sizes pose several material handling challenges. LCD sheets normally are trimmed around the edges with a score-and-break table prior to metrology. This trimmed glass sheet is referred to as a "mother" sheet. The mother sheet must be delivered to a distortion gauge and aligned on the top surface over a reference glass with a scribed X, Y grid pattern. The product glass mother sheet is first scribed or marked with product reference marks with a similar X, Y grid pattern on the surface. The distortion gauge then compares the grid pattern on the mother glass to the grid pattern on the reference glass. This process is known at the "first look." After completing this process, the mother glass is then returned to the score-and-break table to be cut into a matrix (M×N) of smaller "child samples". Each child sample is then loaded individually back onto the distortion gauge original position as the first look. The grid pattern on the child sample is compared to the reference glass grid pattern a second time, which is referred to as the "second look."

Periodically, a glass LCD master will be placed on the glass reference plate as a calibration standard. The glass master is used to verify the repeatability and reproducibility of measurements made with the gauge. From one instance to the next, the measurements associated with the glass master plate relative to the glass reference plate should not change, or change by very little, if at all, so any significant change may indicate a problem in the system.

One of the material handling challenges includes moving glass mother sheets and child samples between the score-and-break table and the distortion gauge, or any measurement device. When one sample is being measured on the distortion gauge, the other child samples need to wait in queue. Options considered for loading the distortion gauge include 5-axis robotic loading, pick-&-place, and manual lift-assist. Additional challenges are created based on the range of LCD sheet sizes and the large number of cut patterns required to address customer needs. These cut patterns range from mother sheet (trimmed glass) to 1 by 2, 1 by 3, ⅓ by ⅔, 2 by 2, 3 by 3, all the way to 4 by 4 cut matrix. Based on these requirements, a robotic loading system would be very challenging to program and could be a source of contamination.

To further complicate things, the measurement device, e.g., distortion gauge, may be located in a clean room with very tight environmental controls for both temperature and humidity. Limiting the exposure of the measurement device to outside thermal perturbations is desirable. In an exemplary situation, a system would trim the LCD mother sheet and cut the matrix of child samples in a preparation room outside the measurement room and then provide a means of moving the glass onto the distortion gauge with minimal impact to the clean room environment.

According to one or more embodiments of the present invention, a system including a measurement device and score-and-break table has been developed for a 3200 mm square LCD glass sheet size. This invention addresses the problems associated with: controlling child samples; automatic loading of both mother sheets and child samples; controlling environmental conditions in the measurement room; and/or storage of glass samples for metrology.

The measurement device may be selected from several metrology tools or inspection equipment for LCD glass requiring horizontal loading. In addition to the aforementioned distortion gauge, examples of such metrology equipment that may be used as the measurement device include a stress gauge, a compaction gauge, a thickness gauge, and a warp gauge. The features and implementation of such equipment are known in the art, and substitution of such equipment for the distortion gauge depicted in the following figures would be within the knowledge of a person of ordinary skill in the glass metrology arts.

Figure 1A:
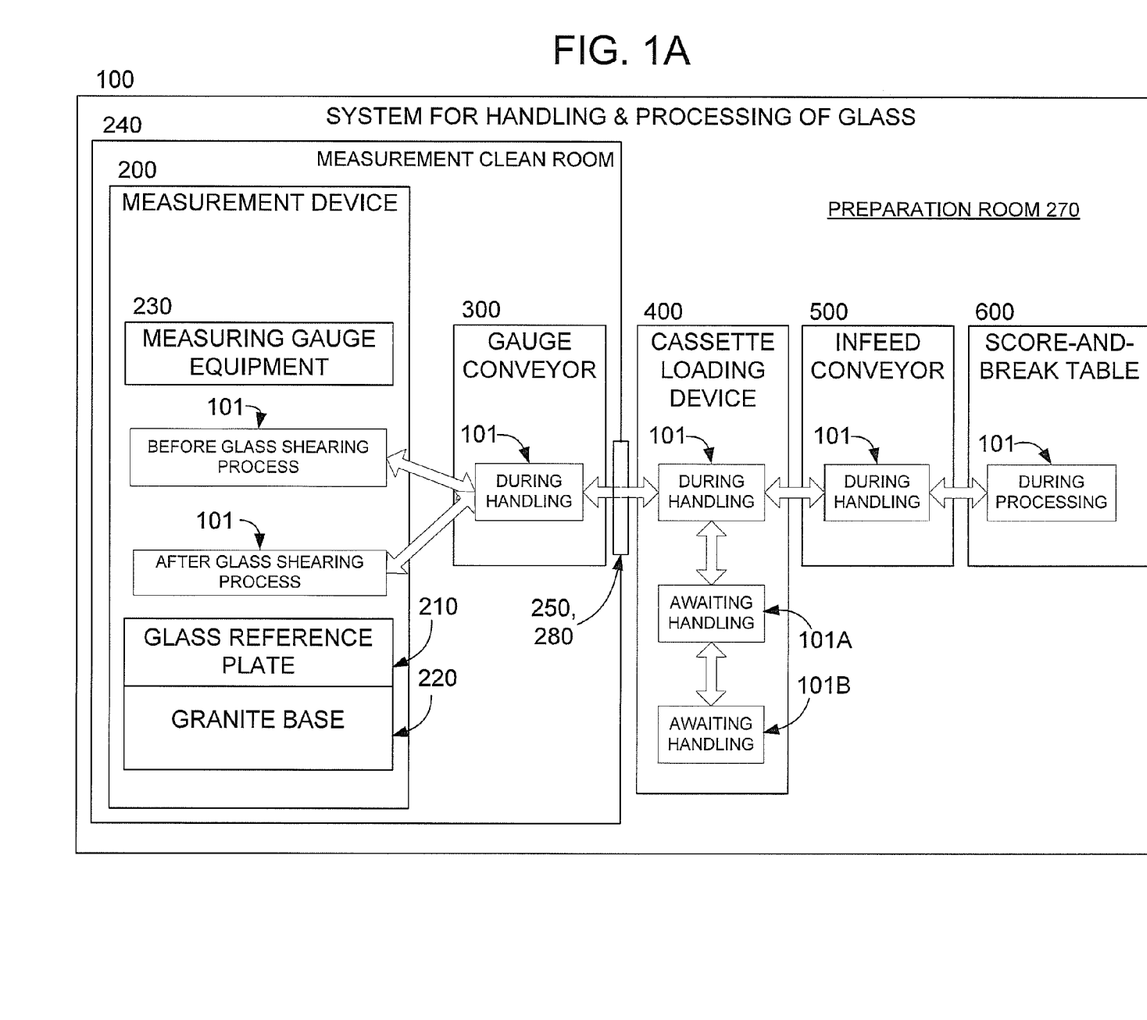
FIG. 1A, FIG. 1B, FIG. 1C, and FIG. 1D are, respectively, a block diagram, a plan view, and two perspective views illustrating exemplary glass handling and processing systems in accordance with one or more embodiments of the present invention.

Referring to FIG. 1A, a block diagram illustrates a system 100 related to glass handling and processing in accordance with one or more embodiments of the present invention. System 100 may perform the handling of glass, the scoring and breaking of product glass, and/or the measurement of optical distortion of product glass. System 100 may include a measurement device 200, such as distortion gauge 200, a gauge conveyor 300, a cassette loading device 400, an infeed conveyor 500, and a score-and-break table 600.

The glass handling and processing system 100 likewise may facilitate handling of product glass 101, such as to and from a glass scribing and shearing process and an optical distortion measurement process, as well as between the processes while glass 101A is stored awaiting handling. By way of example, the product glass 101 may comprise CORNING INCORPORATED GLASS COMPOSITION NO. 1737 or CORNING INCORPORATED GLASS COMPOSITION NO. EAGLE[2000]™ or CORNING INCOPRPORATED GLASS COMPOSITION NO. EAGLE XG™. These glass materials have numerous uses, in particular, for example, the production of liquid crystal displays.

Figure 1B:
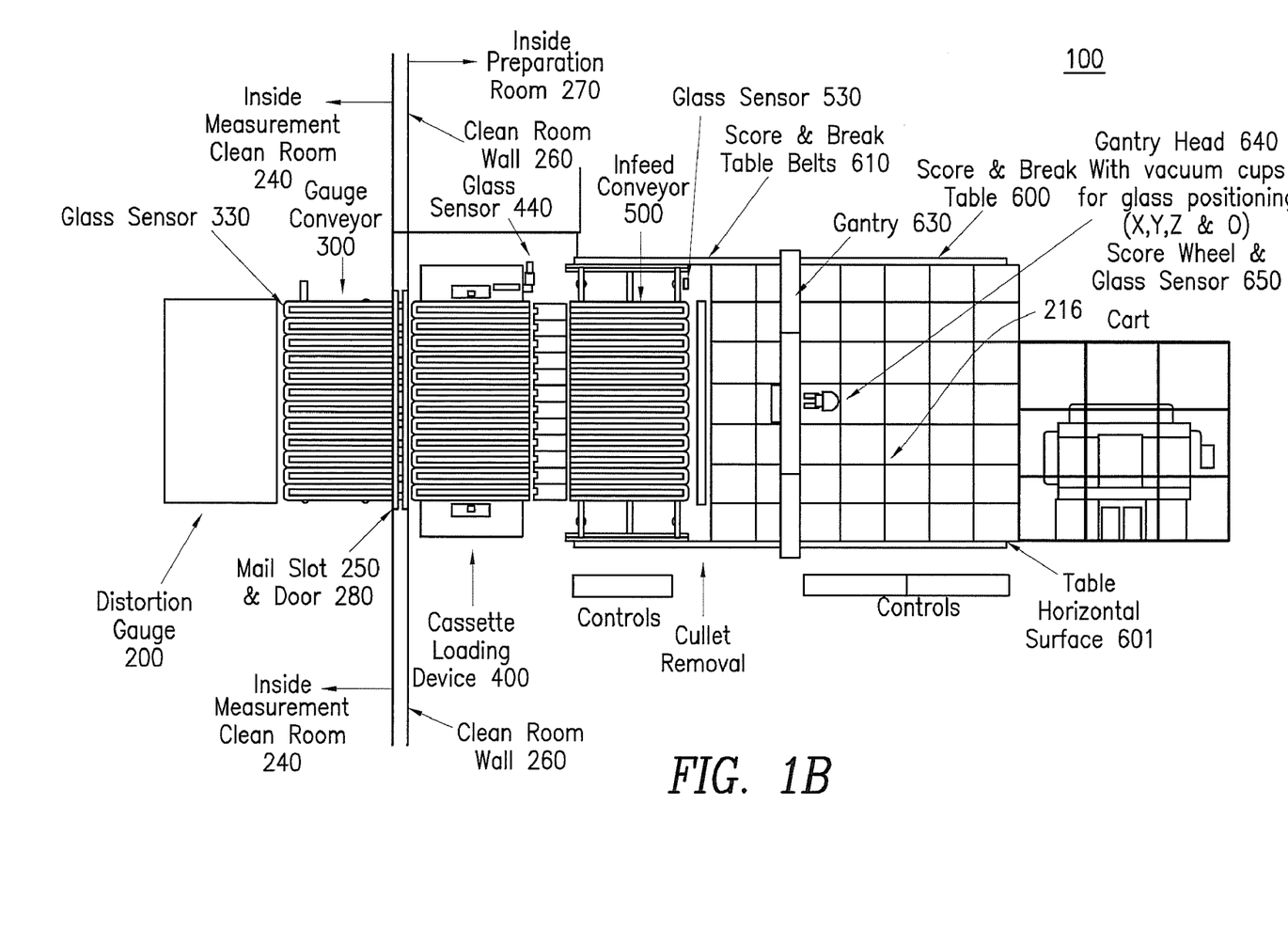
Figure 1C:
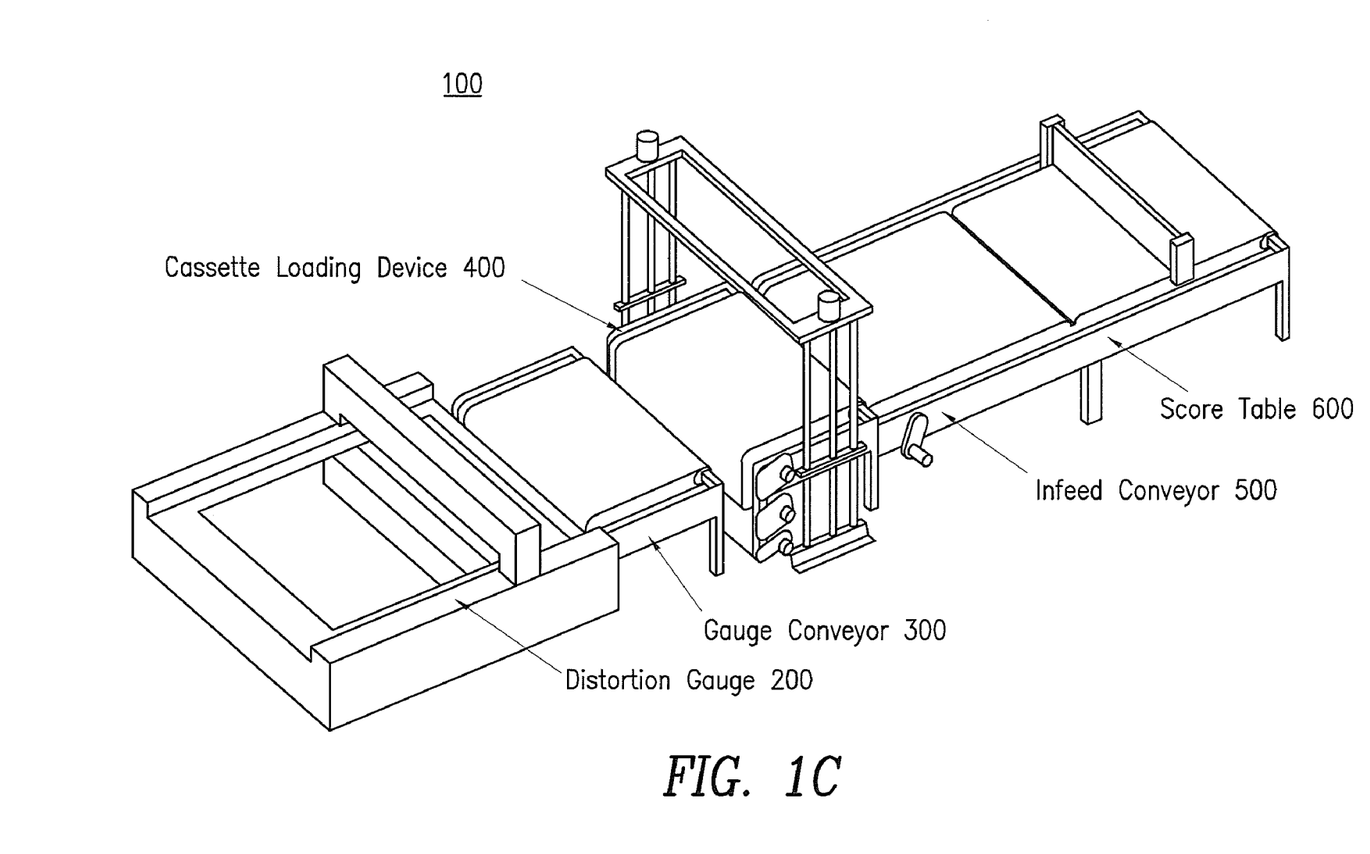
Figure 1D:
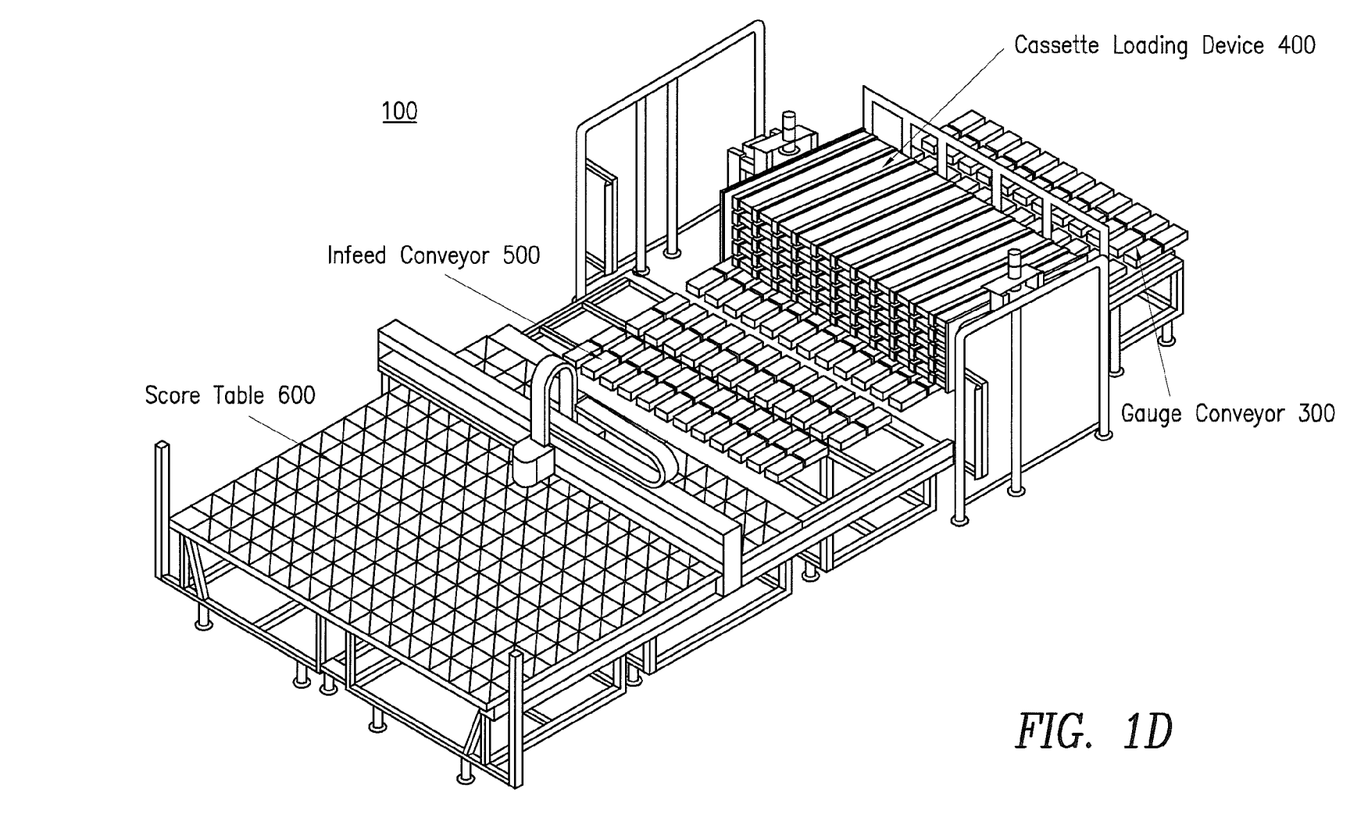

Referring to FIG. 1B, FIG. 1C, and FIG. 1D, there are illustrated, respectively, a plan view of an exemplary glass handling and processing system 100 and two perspective views of further exemplary glass handling and processing systems 100, in accordance with aspects of the present invention. The views of FIG. 1B, FIG. 1C and FIG. 1D are provided to facilitate visualization of the components of system 100, but should not be used to limit the scope of the invention.

Figure 2A:
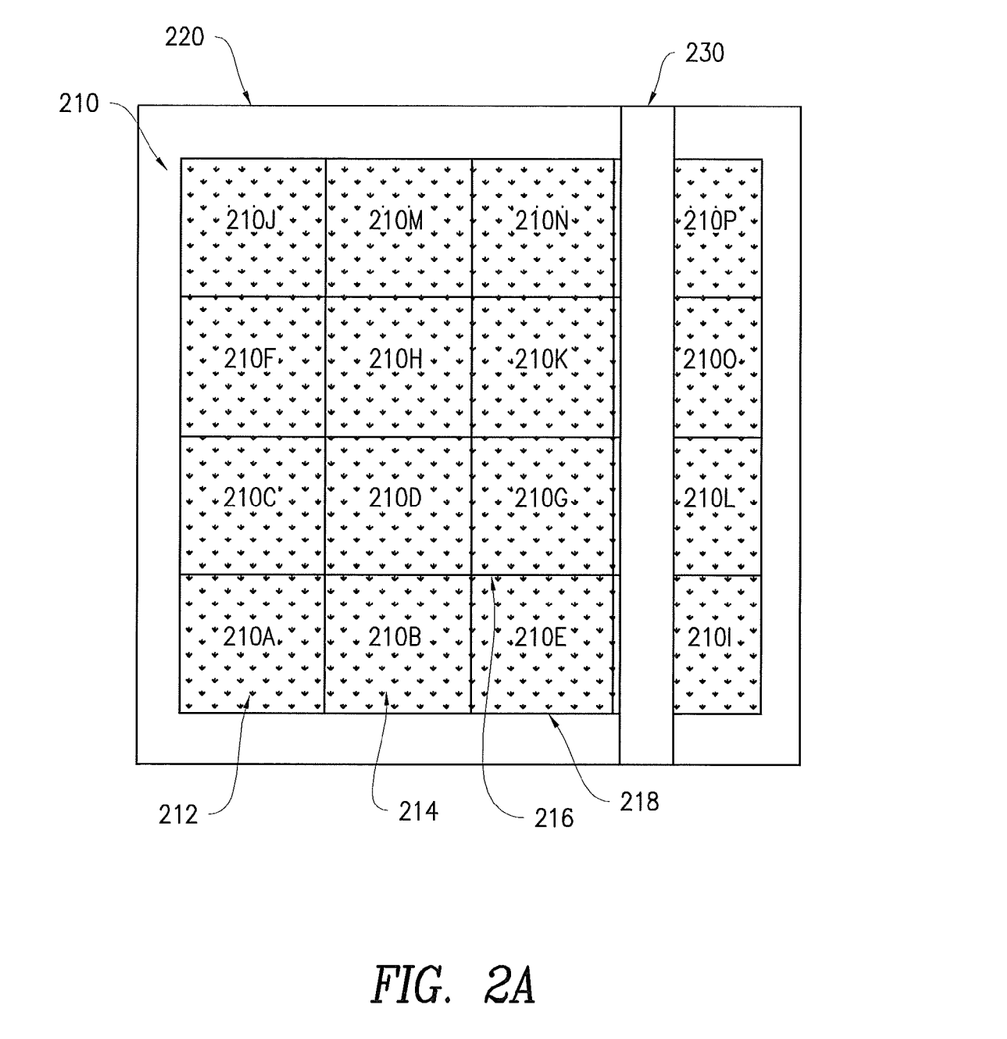
FIG. 2A and FIG. 2B are a block diagram illustrating a plan view, and a perspective view, of an exemplary distortion gauge in accordance with one or more embodiments of the present invention.
Figure 2B:
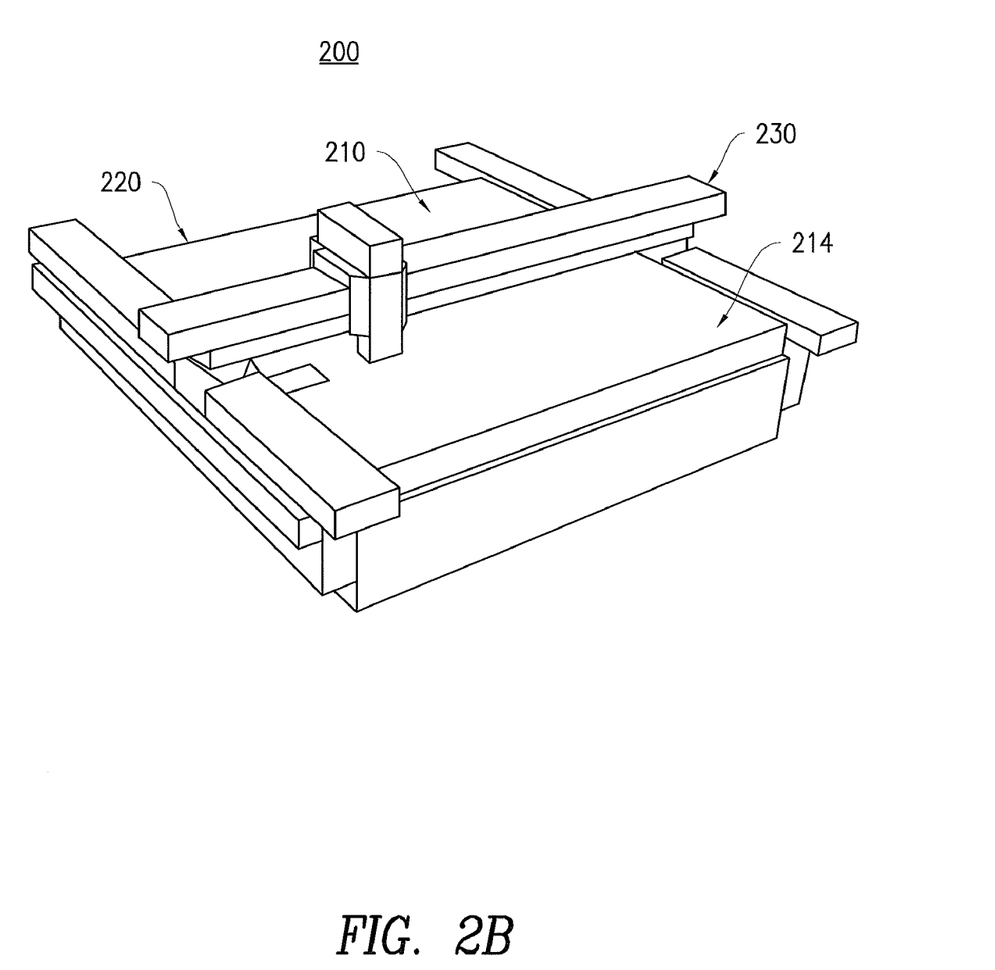

Referring to FIG. 2A and FIG. 2B, a block diagram plan view and a perspective view illustrate an exemplary distortion gauge 200 in accordance with one or more embodiments of the present invention. Distortion gauge 200 may include a glass reference plate 210, a flat base 220, for example made of granite, and measuring gauge equipment 230. The glass reference plate 210 may rest on the flat base 220 and act as an interface between the flat granite base 220 and the product glass 101 to be measured.

In one or more embodiments, measurement device 200, such as distortion gauge 200, may be placed in a measurement room 240, such as an environmentally controlled clean room with tight controls over temperature (20 degrees C.+/−0.1 degrees C.) and relative humidity (Set Point+/−2%). The glass 101 may enter the measurement clean room 240 via a mail-slot opening 250 in the wall 260 of the room 240 in order to minimize the effect on the clean room environmental conditions when glass 101 is transported into and out of the room 240. Outside the measurement room 240, the other components may reside in a preparation room 270.

According to one or more embodiments of the present invention, the glass reference plate 210 may be made using a glass having thermal expansion properties similar to those of the product glass 101 to be measured. One or more embodiments of the glass reference plate 210 may be constructed of Schott Borofloat Borosilicate Glass, ground and polished on both sides for a finished thickness of 6.8 mm.

Each reference plate 210 may be perforated with holes 212 to allow air flow as necessary to float (via positive air pressure of forced air) or hold (via negative air pressure of suction) the product glass 101 as required. Due to the fragility and sensitivity of glass, such as to scratches, localized pressure on glass from hard surfaces may be advantageously avoided, so glass may be transported using distributed air pressure. For instance, product glass 101 may be placed into location by lifting the product glass 101 with positive air pressure. Positive air pressure through the plate 210 may float the product glass 101 to align and reposition it. Once in position, suction applied through the plate 210 to the product glass 101 may hold it in place relative to the plate 210, so that consistent measurements may be made. The distortion gauge 200 may include an air pressure mechanism (not shown) to regulate the air flow through the holes 212.

The reference plate 210 may be formed from a plurality of blocks coupled together to form an integral plate. The reference plate 210 is shown as a 4×4 array of blocks (areas 210A-210P) separated by seams 216. Although not shown, the top side 214 of the plate 210 may be scribed in an X by Y perpendicular array of scribe lines for use as measurement witness marks. The number, nature and placement of the scribed measurement witness marks are dependent on the desired parameters of a given glass reference and master configuration and within the knowledge and skill of a person of ordinary skill in the art. The reference scribed lines on the reference plate 210 are compared with scribe lines on the sample being measured to determine whether (and to what extent) the sample is distorted. The bottom side 218 of the plate 210 may have an opaque and/or reflective coating, such as a thin layer of aluminum, created, for instance, by physical vapor deposition (PVD) and protected by glass. The reflective coating, as such, is not shown in the Figures, but the reflective effect of the coating is depicted in FIG. 1C, insofar as the reflection of the measuring gauge equipment 230 is visible on the plate 210.

Before and after the product glass 101 to be measured is subjected to a glass shearing process by the score-and-break table, the product glass 101 may be placed on the glass reference plate 210, and measuring gauge equipment 230 may note the location of scribed reference marks on the product glass 101 relative to scribed reference marks 216 on a precision scribed glass master, here the glass reference plate 210. By comparing the location of the scribed reference marks on the product glass 101 relative to the scribed reference marks 216 on the glass reference plate 210 before and after the glass shearing process, a before-to-after change may be measured, with which distortion introduced in the product glass 101 during the glass shearing process can be determined.

Figure 3A:
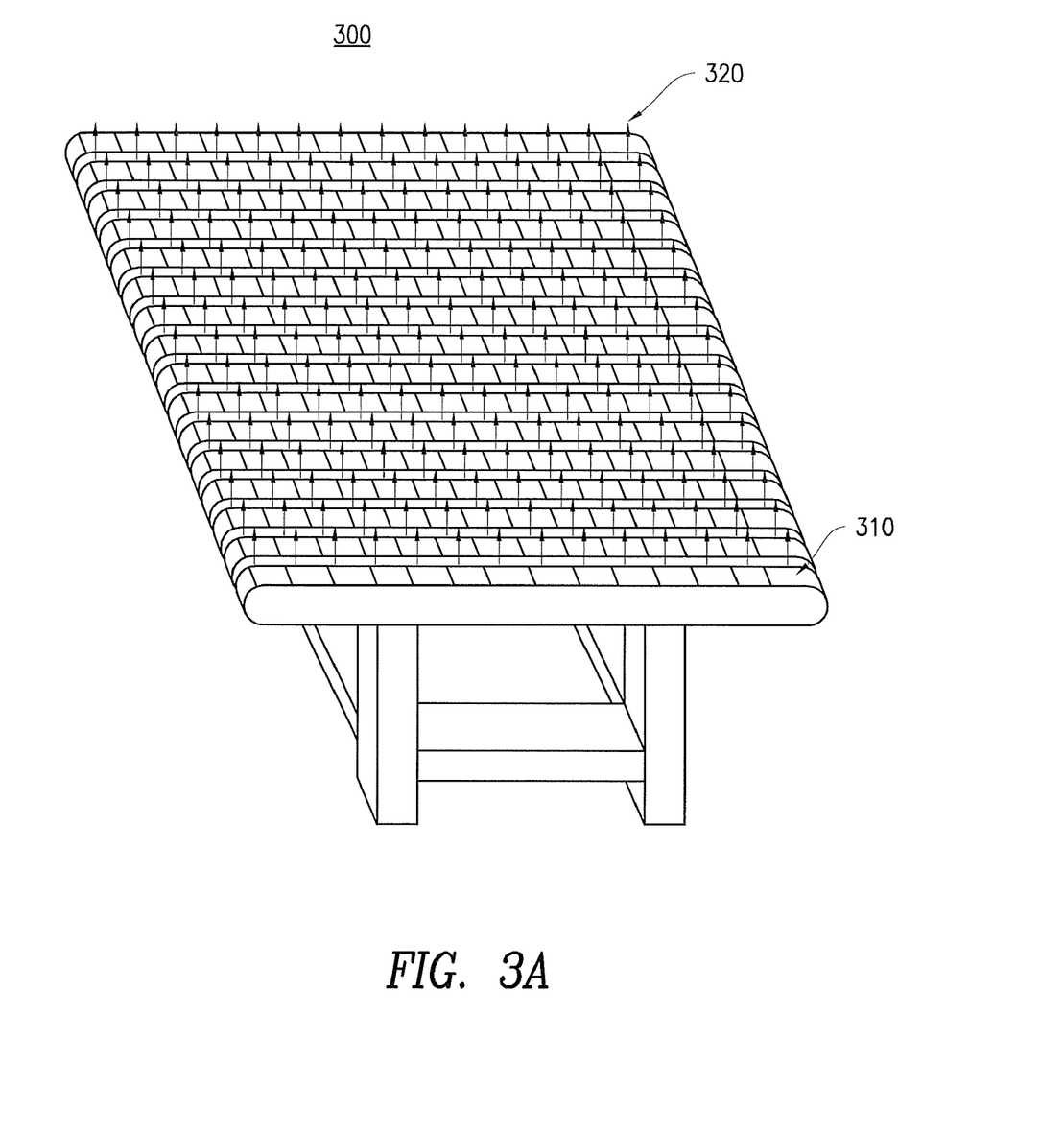
FIG. 3A, FIG. 3B and FIG. 3C are a block diagram illustrating a perspective view, a perspective view, and a planar side view, of an exemplary gauge conveyor in accordance with one or more embodiments of the present invention.
Figure 3B:
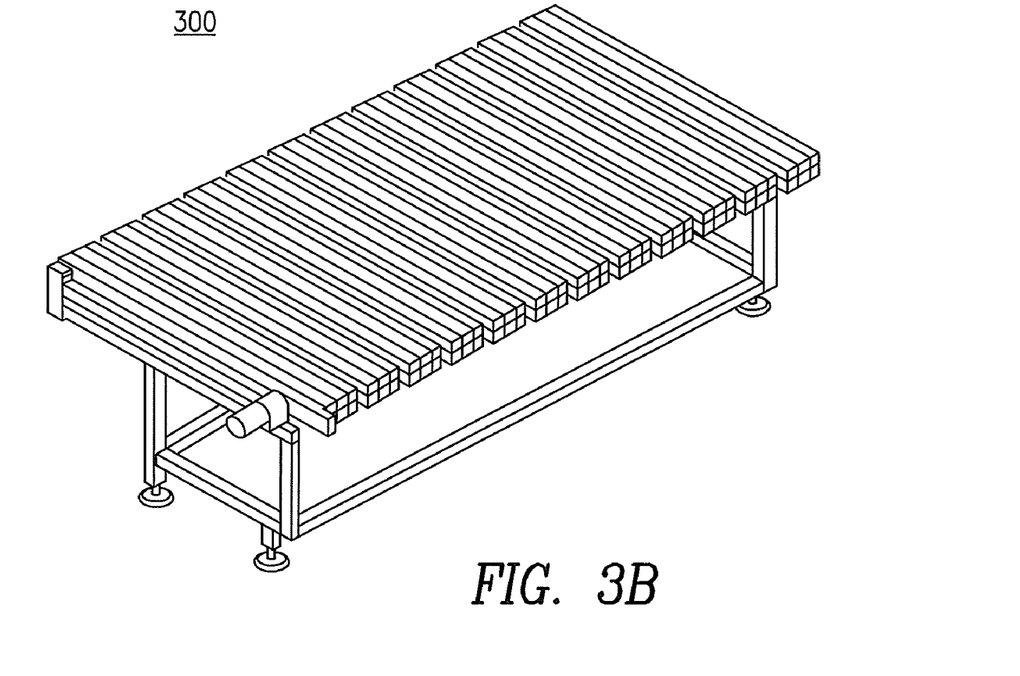
Figure 3C:
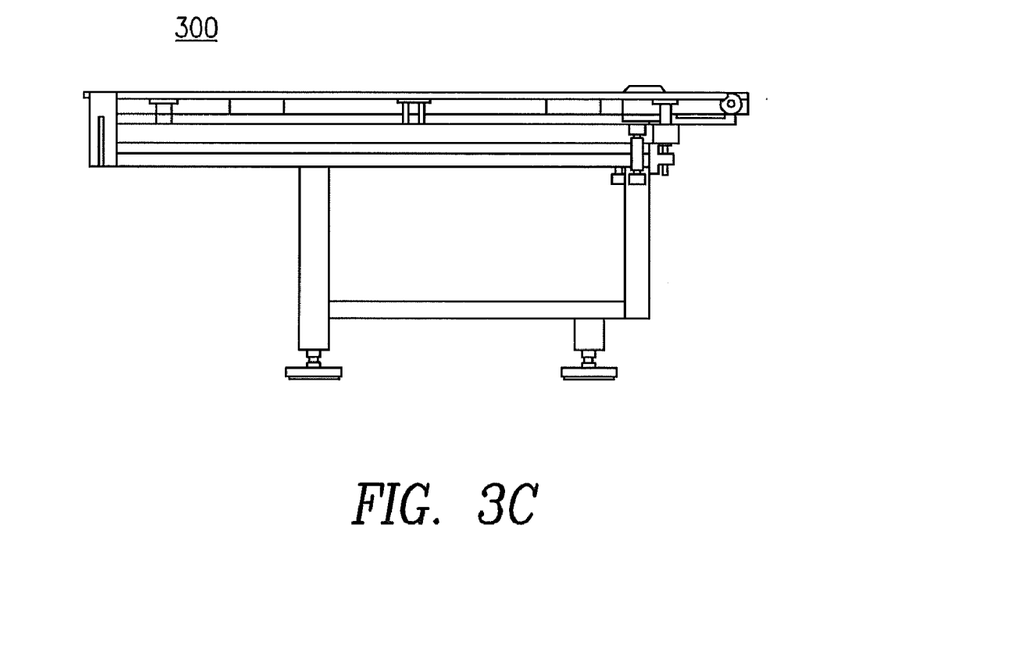

Referring to FIG. 3A, FIG. 3B and FIG. 3C, two perspective views and a planar side view illustrate a gauge conveyor 300 in accordance with one or more embodiments of the present invention. The diagram of FIG. 1B shows the gauge conveyor 300 between the distortion gauge 200 and the mail-slot 250 in wall 260. According to one or more embodiments of the present invention, the gauge conveyor 300 may include horizontal belts, such as made of urethane, of a belt mechanism 310, for moving glass 101 between the cassette loading device 400 and the distortion gauge 200. Gauge conveyor 300 also may include an air pressure mechanism 320 to use air to float the LCD glass 101 above the urethane belts. The gauge conveyor 300 may incorporate glass sensors 330 to monitor the motion of the glass 101 across the surface. In one or more embodiments, as shown in the diagram of FIG. 1B, the gauge conveyor 300 may reside within the distortion gauge clean room 240. When delivering glass 101 between the cassette loading device 400 and the distortion gauge 200, the belt speed of the gauge conveyor 300 may be synchronized with that of the cassette loading device 400.

When the distortion gauge 200 is ready for the samples 101, a door 280 may open in the mail slot 250 in the wall 260 of the measurement room 240 and allow glass 101 to be delivered between the cassette loading device 400 and the gauge conveyor 300 through the very narrow slot 250 in the wall 260. Once the glass 101 reaches the gauge conveyor 300, the glass 101 may be moved across the surface of the gauge conveyor 300 using urethane belts and a servo motor. After driving the glass 101 into position on the gauge 200, suction cups located on the gantry 230 may be used to slightly pick up the glass 101 and pull the glass onto the gauge 200. Air may be supplied to the surface of the gauge conveyor 300 to allow the glass 101 to float above the urethane belts during loading process.

Figure 4A:
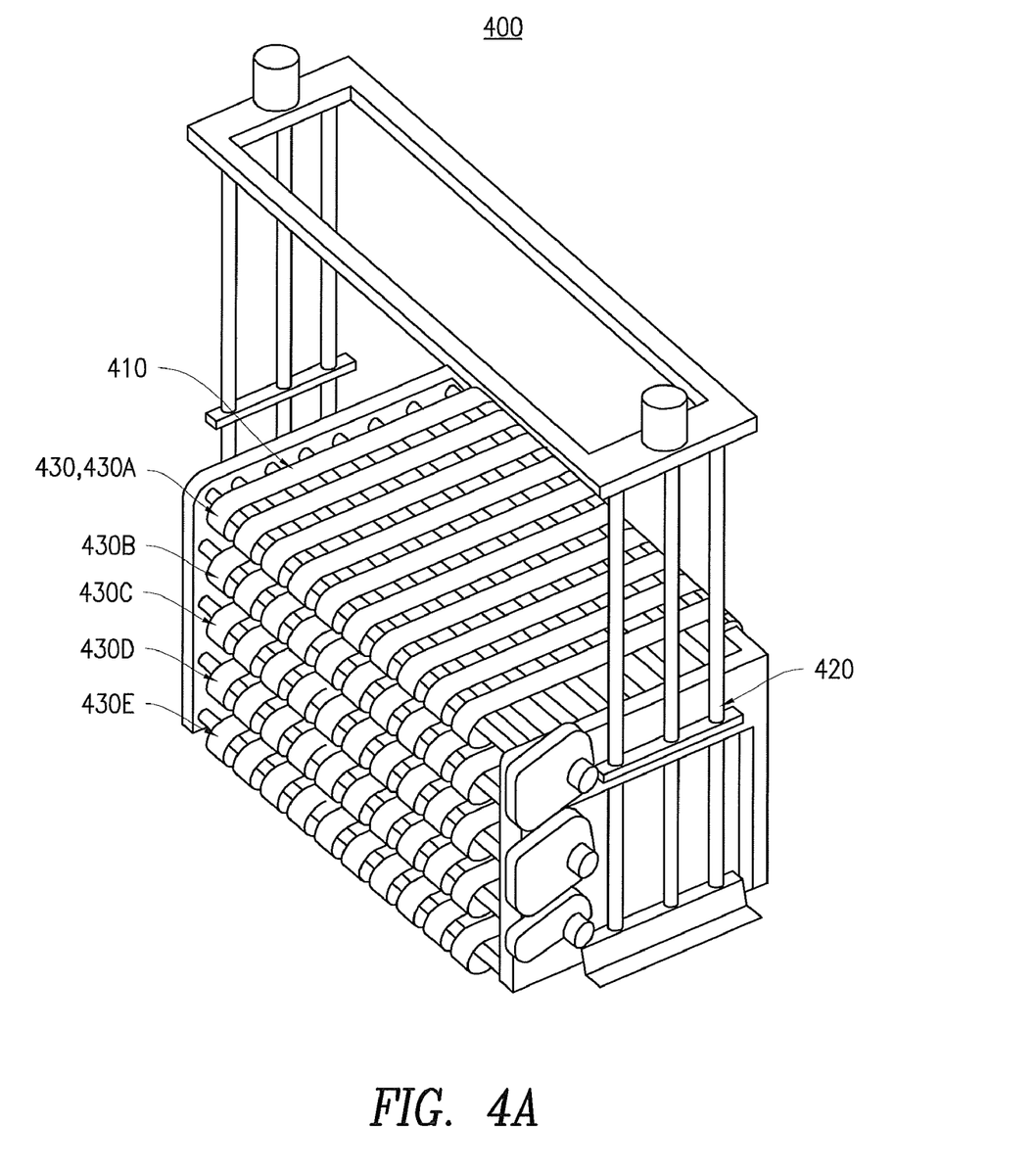
FIG. 4A, FIG. 4B and FIG. 4C are two perspective views and one planar front view of an exemplary cassette loading device in accordance with one or more embodiments of the present invention.
Figure 4B:
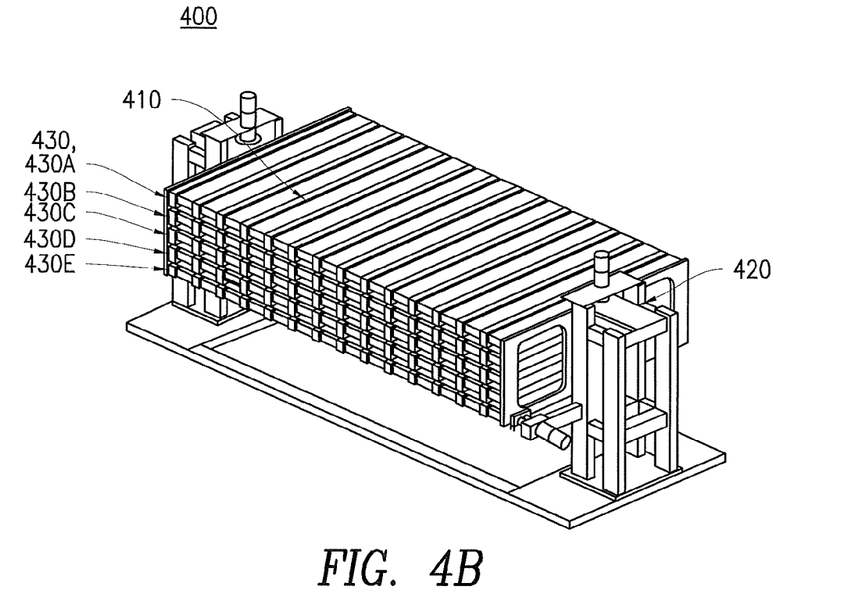
Figure 4C:
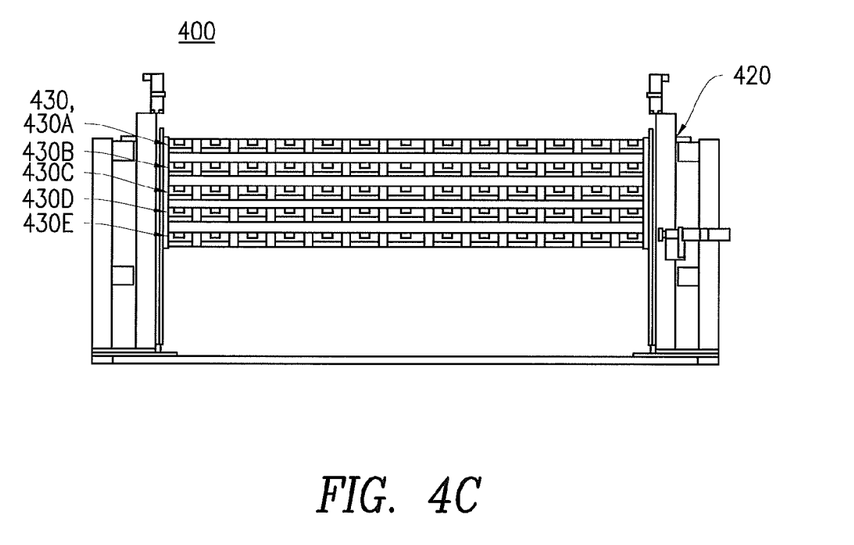

Referring to FIG. 4A, FIG. 4B and FIG. 4C, two perspective views and one planar front view illustrate a cassette loading device 400 in accordance with one or more embodiments of the present invention. According to one or more embodiments of the present invention, the cassette loading device 400 includes a belt mechanism 410 to deliver glass 101 on demand to the measurement device 200, such as distortion gauge 200. The cassette loading device 400 also may include a shelf mechanism 420 that allows storage of glass 101A, 101B samples awaiting handling. The shelf mechanism 420 may include layers, such as shelves 430, with drive belts, such as made of urethane, operated by a servo motor drive mechanism that may be shared with or part of the belt mechanism 410. The cassette loading device 400 also may incorporate glass sensors 440 and the servo motor to monitor the motion of the glass across the surface in order to better control the motion.

In general, the levels 430 are operable to store a glass master plate, store one or more product glass child samples, and/or provide a transfer mechanism. In one embodiment, the cassette 400 may have five levels 430A-E and be used to store up to one half of a GEN 9 sheet (3200 mm×1600 mm), matrix of child samples and a large master sample (3200 mm×1600 mm). In a possible embodiment, the top layer 430A is used to store the glass master for the distortion gauge 200, and the remaining levels 430B-E may be used to store glass child samples and/or to transfer samples. For purposes of discussion, three layers 430B-D may be used to store glass child samples and the remaining layer 430E may be used as a transfer mechanism between the infeed conveyor 500 and the gauge conveyor 300. The glass 101A, 101B can be stored in a horizontal configuration until the measurement device 200, e.g., distortion gauge 200 or other process equipment call for the next sample or sheet of glass 101. The cassette loading device 400 allows integration of the score-and-break table 600 with the measurement device 200 with minimal influence from the surrounding environment. Suitable framing may be used to connect the cassette loading device 400 to the mail-slot opening 250 for smooth exchange of the glass 101 through the mail-slot opening 250. The framing may also function to operate the door 280.

Figure 5:
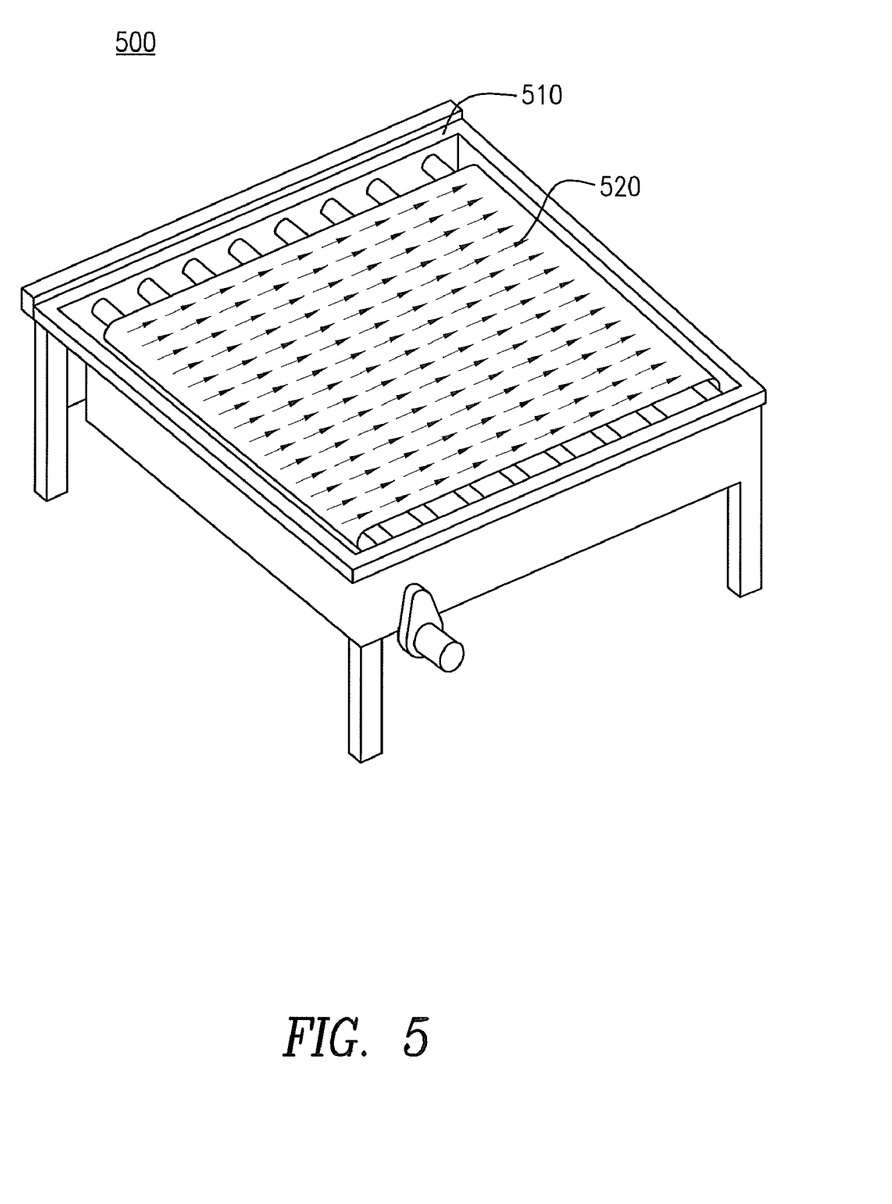
FIG. 5 is a perspective view of an exemplary infeed conveyor in accordance with one or more embodiments of the present invention.

Referring to FIG. 5, a perspective view illustrates an infeed conveyor 500 in accordance with one or more embodiments of the present invention. According to one or more embodiments of the present invention, the infeed conveyor 500 also may be designed in a horizontal configuration, with belts, such as made of urethane, of a belt mechanism 510 for moving glass 101 between the score-and-break table 600 and cassette loading device 400, and with an air pressure mechanism 520 to use air to float the LCD glass 101 above the urethane belts. This floatation capability may be used during the break process on the score-and-break table 600 and related handling. The infeed conveyor 500 urethane belts may be used to deliver glass 101 to the cassette loading device 400. The infeed conveyor 500 also may incorporate glass sensors 530 and a servo motor of the belt mechanism 510 to control the motion of the glass across the surface. When delivering glass 101 onto the cassette loading device 400, the belt speed of the infeed conveyor 500 may be synchronized with that of the cassette loading device 400. Various similarities exist between the infeed conveyor 500 and the gauge conveyor 300, as they perform similar functions.

Figure 6:
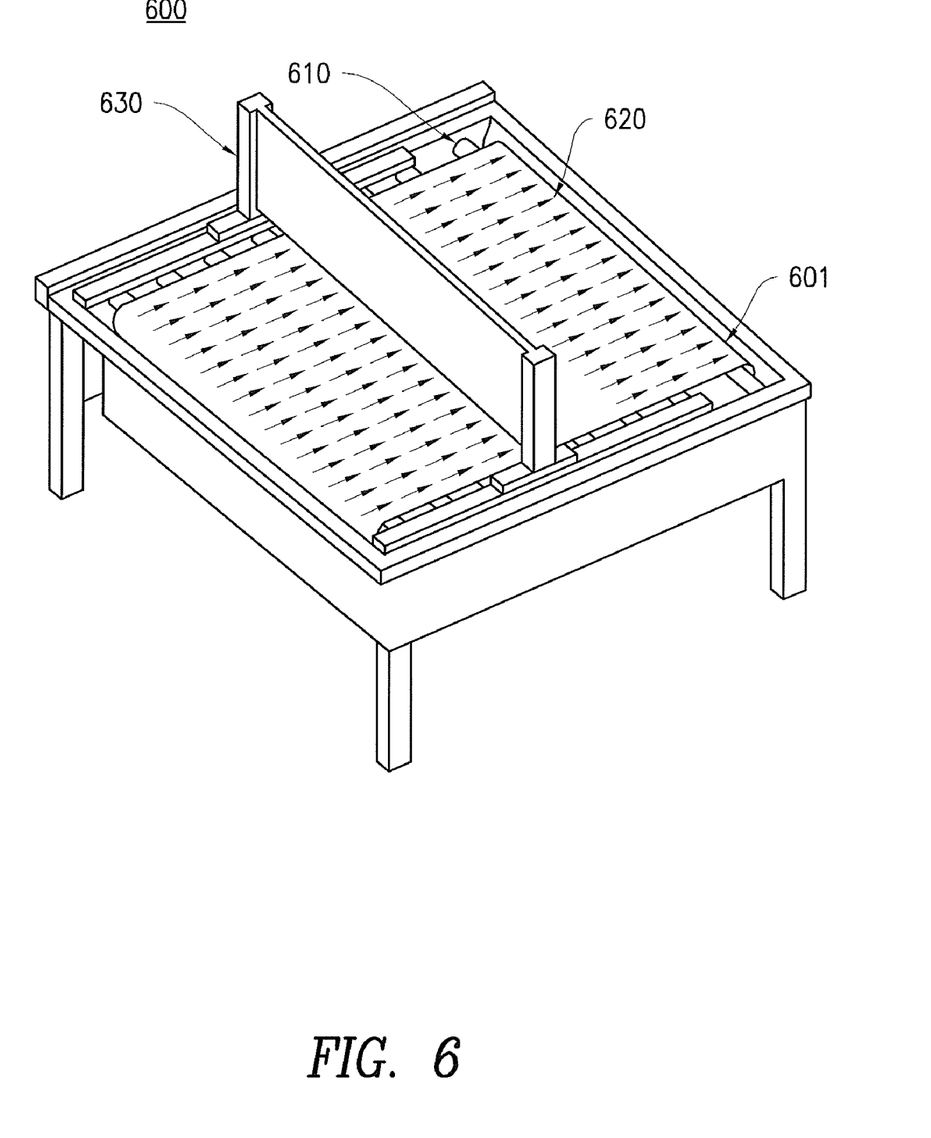
FIG. 6 is a perspective view of an exemplary score-and-break table in accordance with one or more embodiments of the present invention.

Referring to FIG. 6, a perspective view illustrates a score-and-break table 600 in accordance with one or more embodiments of the present invention. According to one or more embodiments of the present invention, the score-and-break table 600 may include a horizontal table surface 601, possibly with belts, such as made of urethane, of a belt mechanism 610, for moving glass 101 between the score-and-break table 600 and cassette loading device 400, and with an air pressure mechanism 620 to use air to float the LCD glass 101 above the belt mechanism 610. This floatation capability may be used during the break process on the score-and-break table 600 and related handling. However, it might be desirable for the score-and-break table 600 may not to have belts 610 on the surface but to use only air to float the glass above the flat table surface.

As also shown in FIG. 1B and FIG. 1D, the score-and-break table 600 may also include a gantry 630 to position and score the product glass 101. The gantry 630 may have a gantry head 640 including vacuum cups for positioning the glass 101, a score wheel, and a glass sensor (such as a laser sensor). The infeed conveyor 500 belt mechanism 510 may be used to deliver glass 101 between the score-and-break table 600 and the cassette loading device 400. The score-and-break table also may incorporate glass sensors 650 and a servo motor to control the motion of the glass across the surface. When delivering glass 101 onto the infeed conveyor 500, the belt speed of the infeed conveyor 500 may be synchronized with that of the score-and-break table 600 or air can be turned on to allow the glass to float across the surface above the belts.

Figure 7:
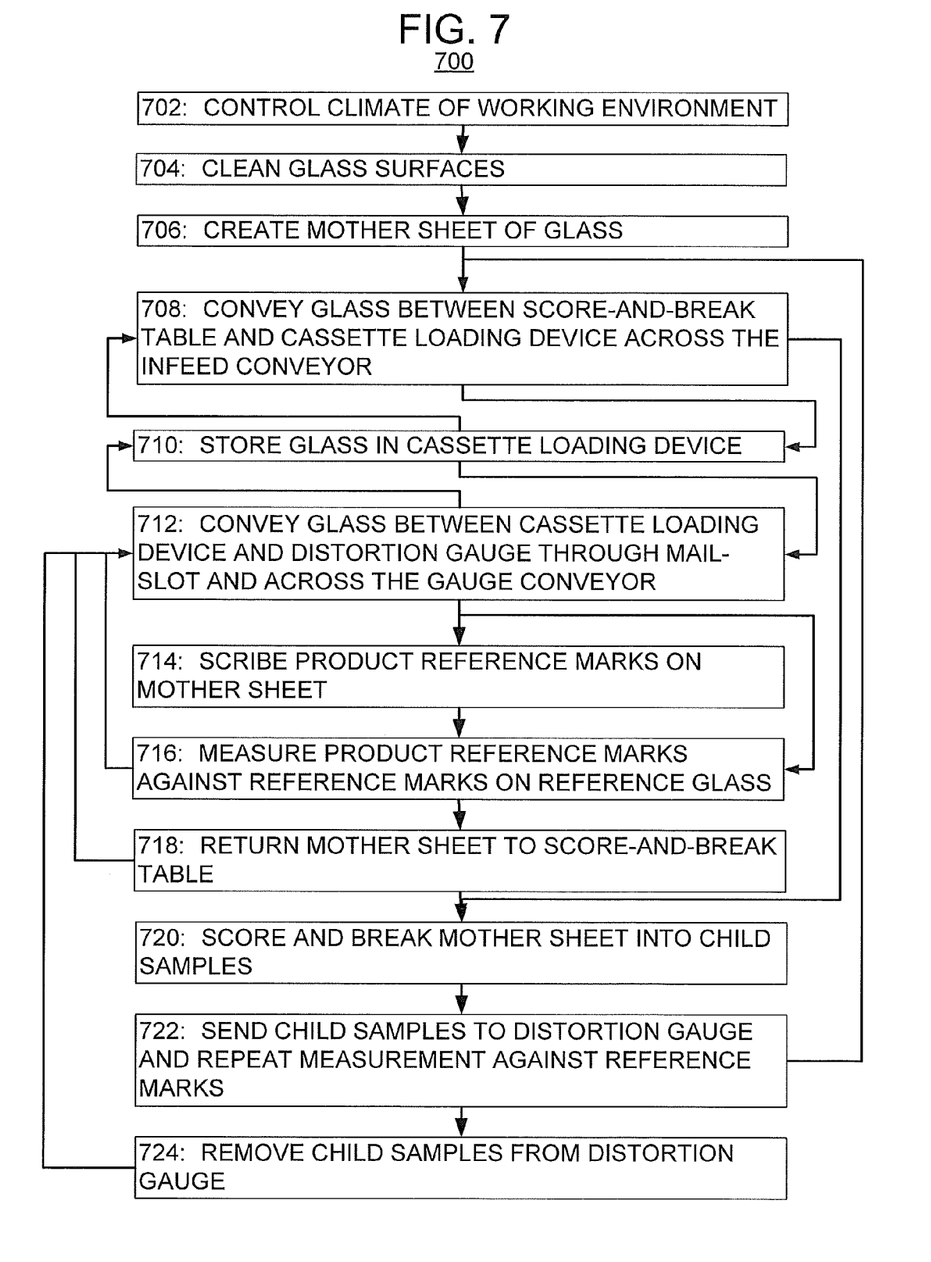
FIG. 7 is a flow diagram illustrating process actions that may be carried out to handle and process product glass in accordance with one or more embodiments of the present invention.

Referring to FIG. 7, a flow diagram illustrates process actions that may be carried out to handle and process glass in accordance with one or more embodiments of the present invention. While the actions described below pertain specifically to use of a distortion gauge 200 as the measurement device 200, comparable actions would apply for other exemplary measurement devices 200. An exemplary assembly process 700 may include some or all of the following actions.

In action 702 of process 700, environmental conditions of a measurement room 240 may be controlled to provide a room temperature of 20 deg. C.+/−0.1 deg. C. and a room humidity of 45 to 50%+/−2%.

In action 704, the entire surface of each glass sheet 101 may be cleaned, such as using glass cleaning solution and a lint-free cloth.

In action 706, the glass 101 may be placed on the score-and-break table 600. On the score-and-break table 600, glass 101 is trimmed around the edges to create the mother sheet.

In action 708, glass 101 may be conveyed between the score-and-break table 600 and the cassette loading device 400 and across the infeed conveyor 500.

In action 710, glass 101 may be stored in a horizontal belt level 430 of the cassette loading system 400, where glass 101A, 101B awaits handling.

In action 712, the glass 101 may be conveyed between the cassette loading device 400 and the distortion gauge 200 across the gauge conveyor system 300 and through a narrow mail-slot 250 in the wall 260 of the measurement room 240.

In action 714, glass 101 may be scribed with product reference marks patterned after reference marks 216 on the glass reference plate 210.

In action 716, the relative position of reference marks of the glass 101 may be measured against reference marks 216 on the glass reference plate 210.

In action 718, the mother sheet glass 101 leaves the distortion gauge to return to the score-and-break table 600. The mother sheet glass 101 may be returned to the cassette loading device 400 by repeating action 712, with the glass 101 traveling in the reverse direction. Action 710 may be repeated as well, if the mother sheet glass 101 is to be stored before further processing. When circumstances permit, action 708 may be repeated, with the glass 101 traveling in the reverse direction to arrive at the score-and-break table 600.

In action 720, the mother sheet glass 101 is scored and broken on the score-and-break table 600 to create child samples of glass 101.

In action 722, the child sample glass 101 may be sent to the distortion gauge 200 for additional measurements. With the child sample glass 101 ready to leave the score-and-break table 600, action 708 may be repeated, with the glass 101 arriving at the cassette loading device 400. Action 710 may be repeated as well, if the child sample glass 101 is to be stored before further processing. When circumstances permit, action 712 may be repeated, with the glass 101 arriving at the distortion gauge 200. Once at the distortion gauge 200, action 716 may be repeated with respect to each child sample.

In action 724, the child sample may be removed from the distortion gauge. The child sample glass 101 may be returned to the cassette loading device 400 by repeating action 712, with the glass 101 traveling in the reverse direction. Action 710 may be repeated as well, if the child sample glass 101 is to be stored before further processing.

Although the invention herein has been described with respect to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of handling and processing glass, the method comprising:
conveying one or more glass sheets from a transfer mechanism, through a slot disposed in a wall enclosing an environmentally controlled room, to a measurement device disposed in the environmentally controlled room;
wherein the measurement device comprises a distortion gauge which employs a glass reference plate and the method further comprises measuring a reference value of a glass sheet with respect to reference marks on the glass reference plate.

2. The method of claim 1, further comprising at least one of:
at least temporarily storing the glass sheets in the transfer mechanism at least one of (i) before they are conveyed through the slot into the environmentally controlled room, and (ii) after they are conveyed through the slot from the environmentally controlled room; and
at least temporarily storing the glass reference plate in the transfer mechanism.

3. The method of claim 2, further comprising: automatically conveying the glass sheets into and out of the slot and temporarily storing the glass sheets in the transfer mechanism such that the sheets do not interfere with one another.

4. The method of claim 3, further comprising: automatically conveying the glass reference plate into and out of the slot and temporarily storing the glass reference plate in the transfer mechanism such that the glass reference plate and the glass sheets may be conveyed into and out of the slot to and from the measurement device without conflict.

5. The method of claim 1, further comprising: conveying the glass sheets between the transfer mechanism and a score-and-break table.

6. The method of claim 5, further comprising:
scoring the glass sheets; and
breaking the glass sheets into child samples.

7. The method of claim 6, further comprising:
measuring a distortion value of the glass sheets with respect to reference marks on the glass reference plate; and
determining distortion levels of the child samples.

* * * * *